(12) United States Patent
Lelarge et al.

(10) Patent No.: US 8,955,450 B2
(45) Date of Patent: Feb. 17, 2015

(54) OFFSHORE INSTALLATION FOR PRODUCING ELECTRICAL ENERGY

(75) Inventors: Virginie Lelarge, Larmor Plage (FR); Daniel Bathany, Plougastel Daoulas (FR); Bernard Pallier, Gouesnou (FR)

(73) Assignee: DCNS, Paris (FR)

( * ) Notice: Subject to any disclaimer, the term of this patent is extended or adjusted under 35 U.S.C. 154(b) by 101 days.

(21) Appl. No.: 13/637,869

(22) PCT Filed: Mar. 29, 2011

(86) PCT No.: PCT/FR2011/050680
§ 371 (c)(1),
(2), (4) Date: Dec. 10, 2012

(87) PCT Pub. No.: WO2011/124820
PCT Pub. Date: Oct. 13, 2011

(65) Prior Publication Data
US 2013/0074498 A1    Mar. 28, 2013

(30) Foreign Application Priority Data

Mar. 30, 2010 (FR) ...................................... 10 52308

(51) Int. Cl.
*B63B 35/44* (2006.01)
*F03G 7/05* (2006.01)

(52) U.S. Cl.
CPC .. *F03G 7/05* (2013.01); *Y02E 10/34* (2013.01)
USPC ........................................ 114/264; 60/641.7

(58) Field of Classification Search
CPC .................................. F03G 7/05; Y02E 10/34
USPC .......... 60/641.6, 641.7, 398; 114/256, 44–48, 114/264–267, 382; 405/224–224.3
See application file for complete search history.

(56) References Cited

U.S. PATENT DOCUMENTS

| | | | | |
|---|---|---|---|---|
| 4,311,012 A | * | 1/1982 | Finley | ........................... 60/641.7 |
| 4,350,014 A | * | 9/1982 | Sanchez et al. | ............... 60/641.7 |
| 4,384,459 A | | 5/1983 | Johnston | |
| 2011/0120126 A1 | * | 5/2011 | Srinivasan | .................... 60/641.7 |

FOREIGN PATENT DOCUMENTS

| | | |
|---|---|---|
| BE | 887 576 | 8/1981 |
| FR | 2356039 A1 * | 1/1978 |
| FR | 2 467 305 | 4/1981 |
| WO | WO 03/006783 | 1/2003 |
| WO | WO 2005/095795 | 10/2005 |

\* cited by examiner

*Primary Examiner* — Thomas Denion
*Assistant Examiner* — Laert Dounis
(74) *Attorney, Agent, or Firm* — Davidson, Davidson & Kappel, LLC

(57) ABSTRACT

This offshore installation for producing electrical energy from thermal energy of the oceans includes a floating platform supporting a generator for producing electrical energy from the temperature difference of the water at the surface and at a depth and associated with a pipe for drawing up water from a depth, is characterized in that the pipe for drawing up water from a depth include three portions, including a first formed with a rigid pipe, the lower end of which is immersed at a great depth and the upper end of which is immersed in midwater at a reduced depth, a second portion formed with flexible pipes for connecting the upper end of this rigid suction pipe to a third portion forming a suction pipe, formed with rigid pumping pipes structuring a lattice of pipes attached under the platform.

4 Claims, 2 Drawing Sheets

OFFSHORE INSTALLATION FOR PRODUCING ELECTRICAL ENERGY

The present invention relates to an offshore installation for producing electrical energy from thermal energy of the oceans.

More particularly, the invention relates to such installation which includes a floating platform on which are loaded means for producing electrical energy from the temperature difference of water at the surface and of water deep down, this platform being further associated with means forming a suction pipe for drawing up water from a depth.

BACKGROUND

The operating principle of such an installation, a so-called OTE (Ocean Thermal Energy) installation, consists of using the temperature difference which naturally exists between water at the surface and water deep down in the oceans for operating a heat engine.

Because of the laws of thermodynamics, in order to have an acceptable efficiency, the application of such OTE installations is only justified when subject to a temperature difference for example of more than 20° C.

Typically, the water may for example be at a temperature of 25° C. at the surface and at a temperature of 5° C. at a depth of 1,000 meters.

It is then conceivable that this limits the use of such installations to specific areas such as for example tropical areas.

The cold water then has to be pumped from a very great depth through means forming a suction pipe associated with the platform, while the hot water is pumped at the surface.

Different attempts have already been made for developing installations for producing energy based on OTE.

Attempts were for example conducted by Georges CLAUDE during the thirties.

Of course, other operators have made other attempts since then.

But the very large majority of these different attempts failed because of diverse problems and in particular problems of mechanical strength of certain elements of these installations under the encountered environmental conditions.

Indeed, it is known that in the geographic areas in which these installations may be installed, particular weather conditions may be encountered, such as for example relatively strong marine currents, storms, etc., which causes degradation or even failure of certain parts of the installation.

Moreover it is known that navigation in the area surrounding such installations is relatively delicate because of the presence of a large number of underwater pieces of equipment: connecting means, anchoring lines etc. . . .

SUMMARY OF THE INVENTION

It is an object of the present invention to enhance this type of installations.

The present invention provides an offshore installation for producing electrical energy from thermal energy of the oceans, of the type including a floating platform on which are loaded means for producing electrical energy from the temperature difference of the water at the surface and at a depth and associated with means forming a pipe for drawing up water from a depth, characterized in that the means forming a pipe for drawing up water from a depth include three portions, including one formed with a rigid pipe, the lower end of which is immersed at great depth and the upper end of which is immersed in midwater at a reduced depth, a second portion formed with flexible pipes for connecting the upper end of this rigid suction pipe to a third portion of the means forming a suction pipe, formed with rigid pumping pipes structuring a lattice of pipes attached under the platform, in that the lattice further includes rigid pipes for discharging the waters at the outlet of the electrical energy production means and in that the rigid pipes for discharging waters are positioned at the periphery of the rigid pumping pipes in the lattice.

According to other aspects of the invention, the offshore installation for producing electrical energy comprises one or more of the following features:
 the lattice includes an intermediate float,
 the intermediate float is provided with means for attachment of means for anchoring the platform, and
 the upper end of the rigid suction pipe includes a manifold for connecting flexible pipes.

BRIEF DESCRIPTION OF THE DRAWINGS

The invention will be better understood from the description which follows, only given as an example and made with reference to the appended drawings, wherein.

DETAILED DESCRIPTION

Figure 1:
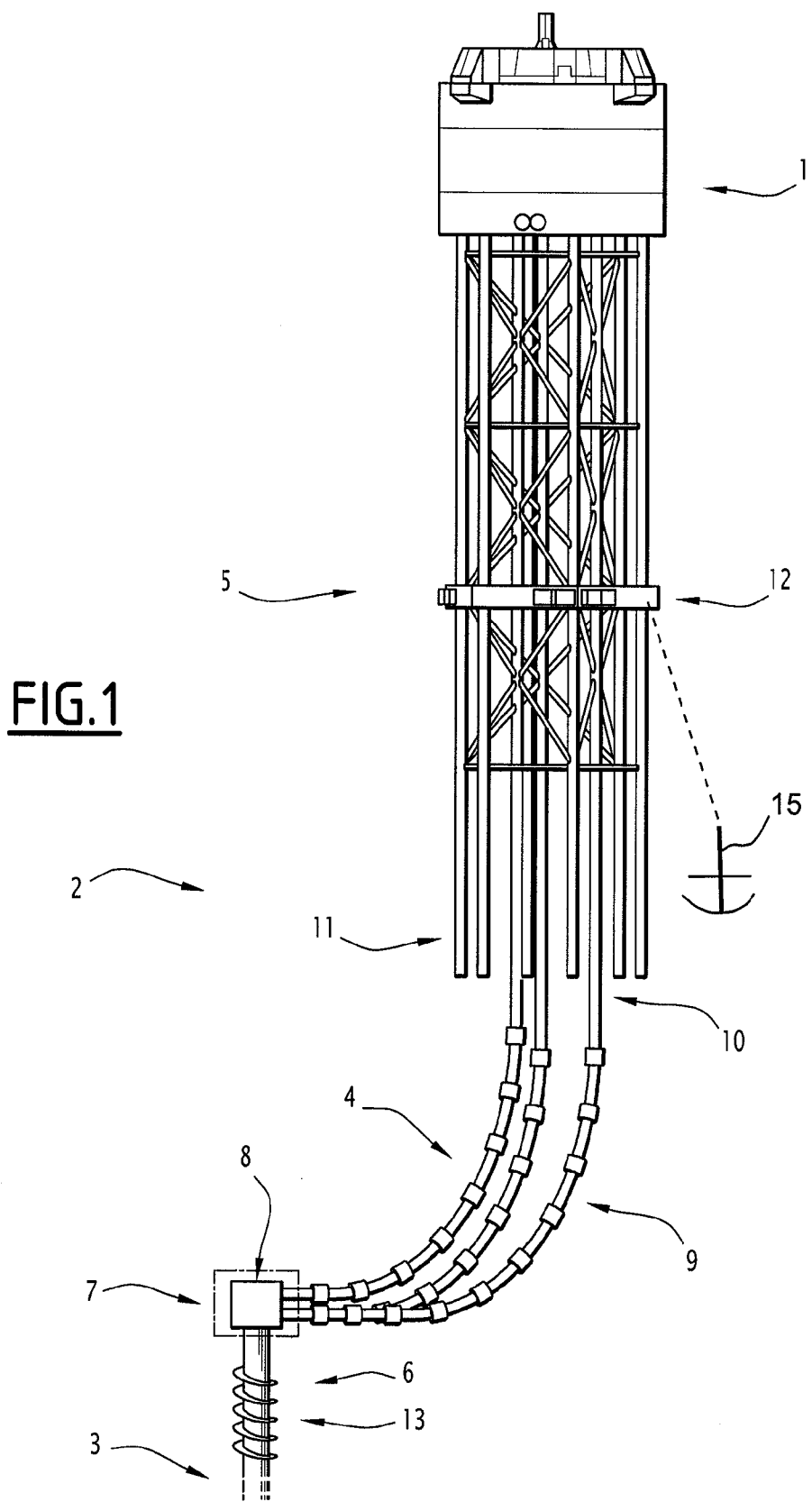
FIG. 1 illustrates a side view illustrating the general structure of a production installation according to the invention.

Indeed, an offshore installation for producing electrical energy from thermal energy of the oceans, a so-called OTE installation, is illustrated in these figures and in particular in FIG. 1.

Generally, such an installation includes a floating platform designated by the general reference 1 in this FIG. 1, on which are loaded means for producing electrical energy from the temperature difference of the water at the surface and at a depth. As these means are not part of the invention, they will not be described in more detail in the following.

As this was indicated earlier, such an installation requires pumping of hot water at the surface or in the vicinity of the surface and of cold water at a very great depth such as for example at a depth between 600 and 1,200 meters.

This hot water and this cold water then allow operation of means for producing electrical energy from the temperature difference of these waters.

For this purpose, the floating platform entering the structure of the production installation according to the invention is associated with means forming a pipe for drawing up water from a depth. These means are designated by general reference 2 in this figure and in fact include three portions designated by the general references 3, 4 and 5 respectively in this FIG. 1.

The first portion designated by the general reference 3 is formed with a rigid pipe designated by the general reference 6, the lower end of which is immersed at a great depth for example between a depth of 600 and 1,200 meters and the upper end of which is immersed in midwater at a reduced depth for example of a few meters or few tens of meters, as this is illustrated.

This upper end of this rigid pipe 6 is then associated with means forming a supporting buoy or float designated by the general reference 7 in this figure allowing this rigid pipe 6 to be maintained in position.

Means in the form of a manifold designated by the general reference 8 allow the upper end of this rigid pipe 6 to be connected to the second portion 4 of the means forming a suction pipe. This second portion 4 of the means forming a suction pipe is in fact formed with flexible pipes, one of which is for example designated by general reference 9 for connecting the rigid pipe 6 to the first portion 5 of the means forming a suction pipe. This third portion of the means forming a suction pipe in fact consists of a mechanically welded lattice of rigid pipes.

Thus, for example, the manifold 8 may be connected to three flexible pipes themselves connected to three rigid pumping pipes attached under the platform and one of which is designated by the general reference 10.

In fact, this lattice may also include rigid pipes for discharging the waters at the outlet of the electrical energy production means such as for example the pipe designated by the general reference 11.

Figure 2:
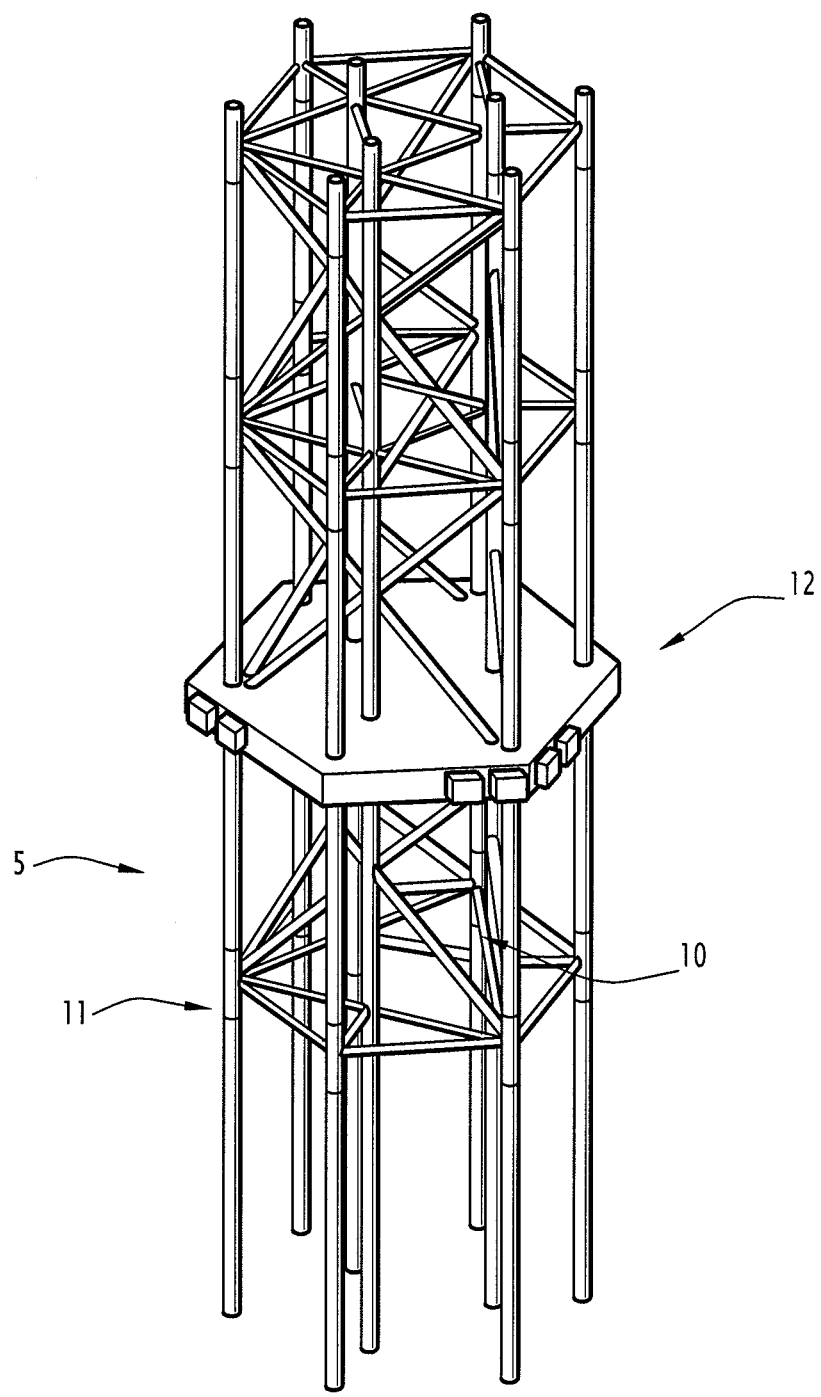
FIG. 2 illustrates a perspective view illustrating the structure of a lattice entering the structure of an installation according to the invention.

In the exemplary embodiment illustrated in these figures, the lattice includes six rigid pipes for discharging the water, positioned as a circle around or at the periphery of the three suction pipes, as this is more clearly visible in FIG. 2.

Of course, it is obvious that it is possible to envision a different number and different arrangements of these different pipes.

It will be noted as this is also illustrated in FIG. 2, that the lattice may be equipped with an intermediate float such as the one designated by the general reference 12 in these figures, this float also being for example equipped with means for attachment of means for anchoring the platform, shown schematically as 15, in order to maintain it in position.

The lattice is then formed with rigid pipes, assembled and attached to each other via reinforcement beams with which the integrity of this lattice may be maintained under the platform.

It is then conceivable that such a structure gives the possibility of solving a certain number of problems encountered with the installations of the state of the art notably at the junction between the rigid pipe for drawing up water from a depth and the floating platform.

Indeed, one of the main causes of the failures encountered in the state of the art during the application of installations of this type, is related to the deformation or even the failure of the junction area between the rigid suction pipe and the platform. By using a structure such as described in the present application, these problems are solved insofar that flexible pipes allow decoupling of the rigid pipe of the platform and in particular decoupling of the relative movements of these units.

Moreover, the use of pipes for discharging the waters at the outlet of the production means, under the platform, also allows the depth for these discharges to be adapted, while adapting the corresponding length of the discharge pipes.

The use of an intermediate float on the lattice also allows the surrounding area of the floating platform to be cleared, which allows navigation to be facilitated in the surrounding area of the latter.

The buoy- or float-shaped means 7 associated with the rigid suction pipe may have any suitable structure equipped with ballasting means with which the function of maintaining this pipe in position may be ensured.

It will also be noted that the outer surface of the rigid suction pipe may include at least one external helical rib, a so-called « anti-vortex » rib designated by the general reference 13 in this FIG. 1, in a standard way.

Of course it is obvious that further different embodiments may be envisioned.

What is claimed is:

1. An offshore installation for producing electrical energy from thermal energy of the oceans, comprising:
    a floating platform supporting a generator for producing electrical energy from a temperature difference of water at a surface and at a depth;
    a suction pipe structure for drawing up the water from the depth and associated with the floating platform, the suction pipe structure for drawing up water from the depth including three portions,
    a first portion formed by a rigid pipe having a lower end and an upper end, the lower end being immersed at the depth and the upper end immersed midwater at a reduced depth less than the depth, a second portion formed with flexible pipes for connecting the upper end to a third portion of the suction pipe structure, the third portion formed with rigid pumping pipes; and
    rigid discharge pipes for discharging the water outlet by the generator, the rigid pumping pipes and the rigid discharge pipes defining a lattice attached under the platform, the rigid discharge pipes positioned at a periphery of the rigid pumping pipes in the lattice.

2. The offshore installation as recited in claim 1 wherein the lattice includes an intermediate float.

3. The offshore installation as recited in claim 2 wherein the intermediate float includes an attachment for an anchor for the platform.

4. The offshore installation as recited in claim 1 wherein the upper end includes a manifold for connecting the flexible pipes.

* * * * *